(No Model.) 2 Sheets—Sheet 1.
J. W. SUTTON.
APPARATUS FOR REMOVING THE WATER HAIR FROM SEAL AND OTHER SKINS.
No. 276,923. Patented May 1, 1883.
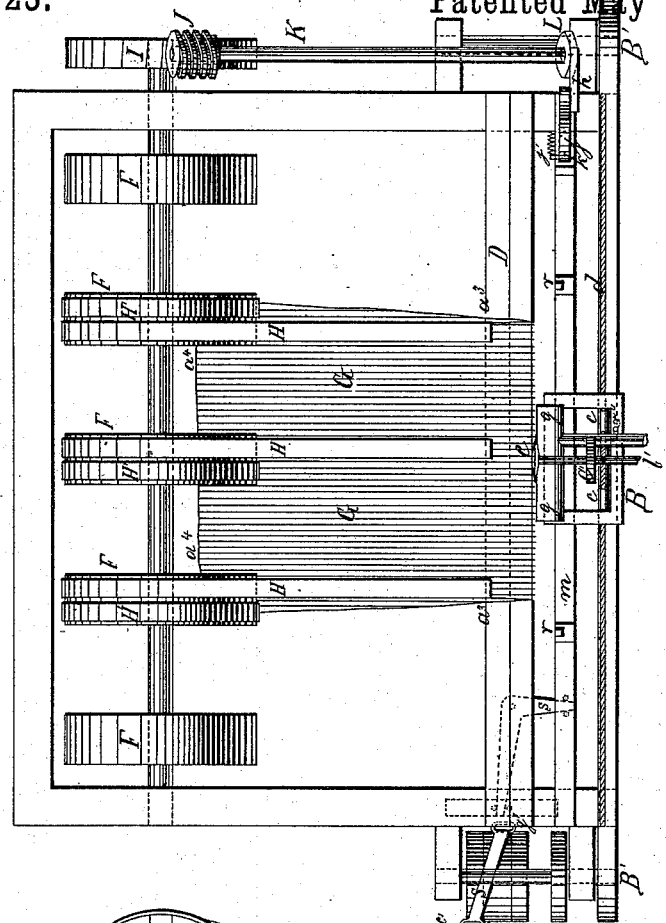
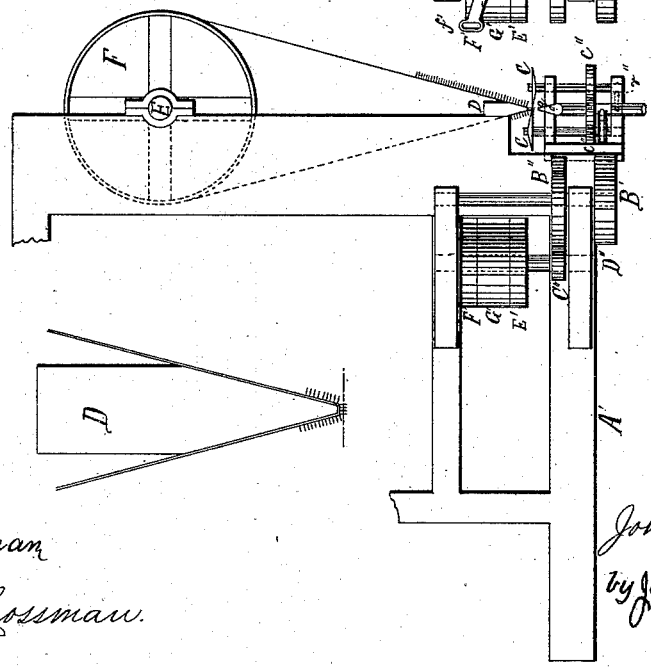
Witnesses:
Rudolf Bjellman
Thomas E. Crossman.
Inventor
John W. Sutton
by James A. Whitney
Attorney

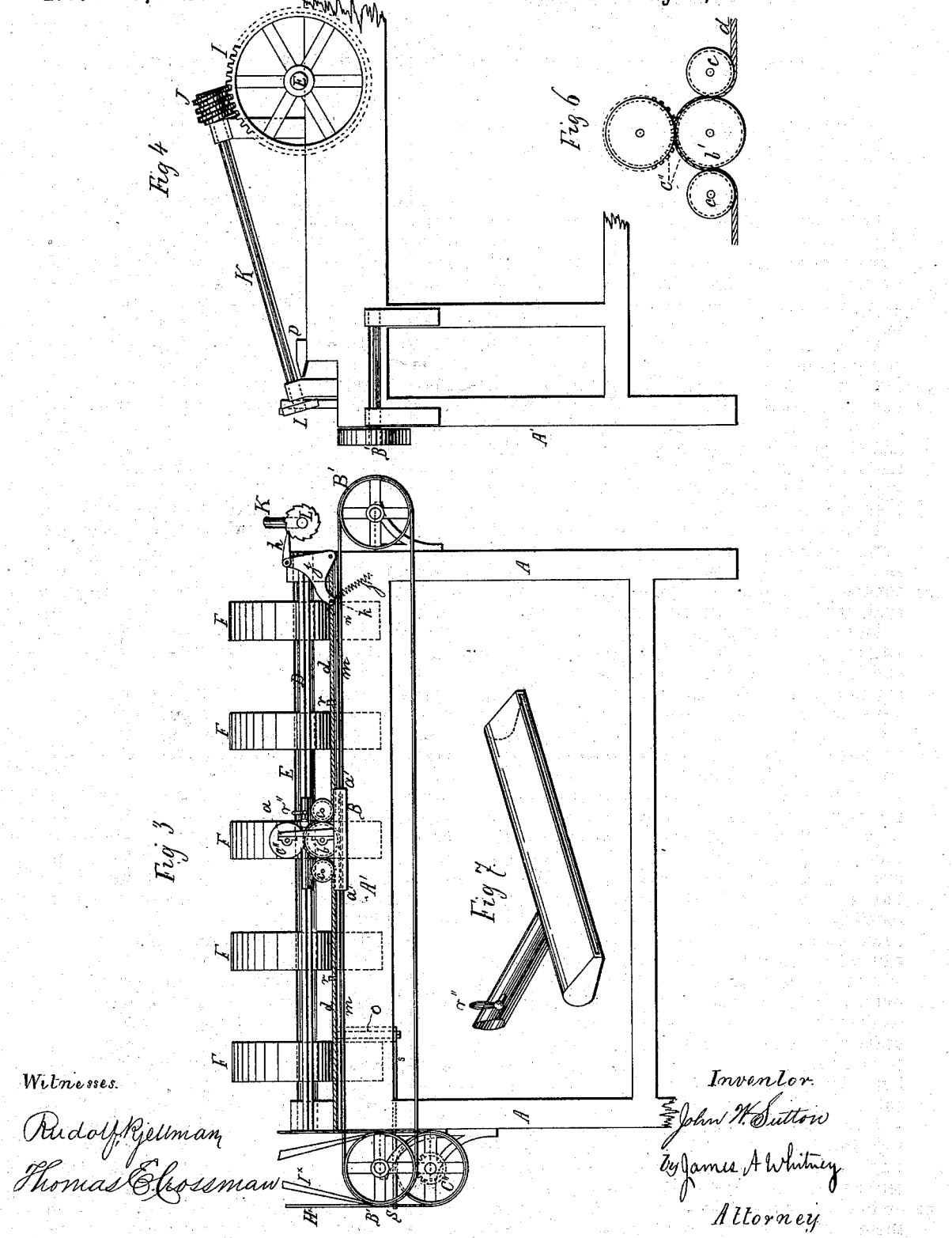

UNITED STATES PATENT OFFICE.

JOHN W. SUTTON, OF NEW YORK, N. Y.

APPARATUS FOR REMOVING THE WATER-HAIR FROM SEAL AND OTHER SKINS.

SPECIFICATION forming part of Letters Patent No. 276,923, dated May 1, 1883.

Application filed August 11, 1882. (No model.)

*To all whom it may concern:*

Be it known that I, JOHN W. SUTTON, of the city, county, and State of New York, have invented certain Improvements in Apparatus for Removing the Water-Hairs from Seal and other Skins, of which the following is a specification.

The object of this invention is to provide an improved means of cutting from the skins of seal and other like fur-bearing animals the stiff water-hairs, which, if not removed, would impair the beauty and value of the fur, the object of my said invention being to provide for the closer and more uniform removal of the said water-hairs from the said skins than has been hitherto secured.

To this end my invention comprises certain novel combinations of parts, whereby said object is effectually attained, and great operative capacity, combined with comparative simplicity of structure, is secured in the machine.

Figure 1 is a plan view. Fig. 2 is a side elevation, Fig. 3 a front view, and Fig. 4 an end view, of an apparatus constructed according to my said invention; and Figs. 5 and 6 are detail views on a larger scale, representing one of the devices embraced in my said invention; and Fig. 7 is a detail view of another device included therein.

A is the frame of the machine, upon the horizontal front portion, A', of which are provided ways or guides which receive a traveling carriage, B, capable of a to-and-fro movement from one end of the said frame to the other alternately in opposite directions. This reciprocating movement of said carriage B is secured by means of a long strap, the ends of which are attached, as shown at $a'$, to the ends of the carriage, and which passes over two pulleys, B', one at each end of the machine, so that these two pulleys being rotated alternately in opposite directions will move the carriage alternately to the right and to the left. This carriage is provided with a vertical frame, $a$, which is composed of two oppositely-arranged arms, which have suitable bearings for the ends of the mandrels of two rotary cutters, C, the edges of which overlap, after the ordinary fashion of rotary cutters, so as to cut or shear any article passed between them. As an equivalent of these two rotary cutters, there may be employed one rotary cutter acting against a straight shear edge arranged in suitable relation thereto. The mandrels of the said cutters are connected by means of a gear-wheel, $c''$, on each mandrel, so that motion communicated to the one will be transmitted to the other, and upon one of said mandrels is placed a grooved pulley, $b'$. The carriage B also carries two idler-pulleys, $c$, one on each side of the pulley $b'$. A stationary round belt or strap, $d$, is extended horizontally above the parts A' of the frame A, and is secured at its ends to the said frame, this stationary strap or belt passing underneath the idler-pulleys $c$ and over the grooved pulley $b'$, so that when the carriage B is moved to and fro, as hereinbefore explained, the relative movement of the pulley $b'$ with reference to the stationary belt or strap $d$ will transmit a circular motion to the said pulley $b'$, and consequently to the rotary cutters C, the cutters rotating in one direction when the carriage is moved to the right and in the opposite direction when the carriage is moved to the left.

Stationary behind the rotary cutters C is a horizontal bar, D, the forward portion of which is tapered, as represented in Fig. 5; but the front edge of which, instead of being brought to a knife-edge, and instead of being of a rounded contour, is flat in a direction parallel with the plane occupied by the cutters C, said flat edge of the bar D being in substantially the same horizontal plane as the line of intersection between the two rotary cutters as the same traverse from right to left, and vice versa, as hereinbefore set forth.

At the back of the machine—that is to say, in rear of the bar D—is a shaft, E, provided with any suitable number of pulleys F, the hubs or bosses of which are so attached upon the shaft E that the said pulleys may be adjusted at any distance apart, or in any relative position along the length of the shaft E, to take different widths of skins.

G indicates the skin to be treated. To this end the said skin has one edge brought upward over the flat front edge of the bar D, while its main length is extended underneath the same, and thence backward. Each of the pulleys F is provided with two straps, H and H', the former at the top, the latter at the bottom. The straps H are brought over and forward and attached to the one edge, $a^3$, of the skin, the other ends of the straps being attached to the pulley F, while the other straps, H', are brought under and forward and attached to the other edge, $a^4$, of the skin. By giving movement in the requisite direction to the shaft E the pulleys F, drawing upon the straps H, will draw the skin G slowly upward over and across the flat front edge of the bar D, the straps H' simultaneously releasing at a corresponding speed and ratio the opposite end of the skin to permit the movement of the latter just described. This motion is afforded by means of a worm-wheel, I, on the end of the shaft E, into which said worm-wheel there gears a worm, J, on the rearmost end of a shaft, K, the forward end of which has a ratchet-wheel, L, actuated by a pawl, $h$, which is itself attached to the upper arm of an elbow-lever, $j$, the lower arm of said elbow-lever being so connected with a spiral spring, $j'$, as to retract the pawl $h$, and also help to finish the shifting of the belts, as will be hereinafter described. In the said lower arm of the elbow-lever $j$ is a small anti-friction wheel, $k$.

Arranged in a suitable guide upon the horizontal front A' of the frame A is a slide-bar, $m$, upon that end of which adjacent to the elbow-lever $j$ is a triangular stud, $n$, the opposite sides of which form two inclined planes sloping in opposite directions. This bar $m$ is also provided with two stops, $r$, at opposite sides of the carriage B, so that when the said carriage B, nearing the end of its right-hand movement, strikes the right-hand stop $r$ it moves the bar $m$, so that the right-hand surface of the angular stud $n$, acting against the anti-friction roller $k$ on the lower arm of the elbow-lever $j$, tilts the latter to operate the pawl $h$ to turn the ratchet-wheel L one notch, and thereby, through the shaft K, worm J, and worm-wheel I, turning to the requisite degree the shaft E, and consequently drawing upward to the required extent the skin G over and across the flat front edge of the bar D. When the carriage reaches the end of its reverse or left-hand stroke it strikes the other of the stops $r$, and thereby causes the opposite incline of the angular studs $n$ to act upon the elbow-lever to give another impulse or movement to the pawl $h$, thereby again drawing to the requisite degree the skin upward across the aforesaid flat front face of the bar D, so that by this means an intermittent feeding movement is communicated to the skin across the said front flat face of the said bar, this feeding occurring at those stages of the operation when the cutters are not acting upon the skin. After each feeding movement of the skin, as just described, the continued impact of the air-blast from the nozzle $g$ blows the soft fur of the skin away from the immediate line of impact of the air-blast, while the comparatively stiff water-hairs, resisting the air-blast, retain their normally-straight position, and are thus exposed to the action of the rotary cutters as the latter are caused to traverse parallel with and close to the flat front edge of the bar D, over which, as just described, the skin is stretched, and as the carriage traverses to and fro successive narrow portions of the skin are subjected to this cutting action, the soft fur being blown aside, while the cutters traverse close to that portion of the surface of the skin which is strained across the flat front edge aforesaid, and thereby causes the stiff water-hairs to be cut close. It is specially to be observed that the advantageous result arises from the fact that the front edge of the bar is flat, as aforesaid, so that the stiff hairs project forward and deviate but slightly from the horizontal, thereby causing all the stiff hairs thus presented to be cut at a uniform distance from the surface of the skin, instead of some being cut shorter and others longer, as invariably occurs when the skin is stretched over a sharp-edged bar, or over a rounded or convex surface, either of which two will cause the stiff hairs to be presented at a considerable angle to each other; in other words, in positions radial to the curve over the front of the bar, there being in such cases a very material difference in the length of the "stubs" or "stumps," so called, of water-hairs left upon the skin, the result being that the cutting away of the water-hairs is irregular and not uniform, whereas by my said invention aforesaid the water-hairs are all cut at substantially an equal distance from the surface of the skin itself, and this distance is throughout no greater than the shortest distance at which the hairs are cut when a sharp-edged or round-edged bar is used, and they are much less than the distance at which many of the hairs are necessarily cut when such sharp-edged or rounded bars are used.

Furthermore, inasmuch as in my said invention I use rotary cutters for severing the water-hairs, and inasmuch as my air-blast devices are so arranged that the cutters cannot interfere with the air-blast, it follows that the air-blast is so applied as to be sufficient to itself bend and hold aside the soft fur without the assistance of any mechanical devices for holding down the fur, such as have always been found essential where other than rotary cutters are employed for severing the stiff hairs. Inasmuch as the skins vary in width, it is desirable that there should be no waste movement on the part of the carriage B, and to this end the stops $r$ are make adjustable upon the bar $m$ in such manner that the carriage B may actuate them at a shorter or longer stroke, as circumstances may require.

The movement of the carriage B, derived from the strap or belt $d$, is reversed by means of the following mechanism: The shaft of the pulley B' has upon it a gear, B'', below and gearing into which, as represented in Fig. 3, is a pinion, C'', the shaft D'' of which has upon it two fast pulleys, E' and F', with an intermediate loose pulley, G'. From suitable driving-pulleys on any appropriate adjacent shaft are extended two belts—one of them a straight belt, H*, designed to act in conjunction with the fast pulley E′, the other of them a cross-belt, I*, designed to act in conjunction with the fast pulley F′. When the straight belt H* is upon the pulley E′ the cross-belt I* is upon the loose pulley G′, and in like manner when the cross-belt is upon the fast pulley F′ the straight belt is upon the loose pulley G′. It follows therefore that by shifting the belts to actuate first the one of the said fast pulleys and then the other, the shaft G″, actuated through the pinions C′ and spur-wheel B″, will turn the adjacent pulley B′ alternately in opposite directions, and thence through the strap or belt d give the requisite reciprocating movement to the carriage B. In order that this may be done automatically, the bar m, which is actuated, as hereinbefore explained, from the carriage B, is provided with downwardly-extending studs or arms, (shown in dotted outline at O in Fig. 3,) which clasp one arm of a horizontal elbow-lever, s, the opposite end of which is extended between two vertical studs on the upper side of a slide shown in dotted outline at f in Fig. 1, the said slide carrying a belt-shifter, S, so constructed that one of its ends, f′, actuates the straight belt H*, while the other end, g′, is so constructed as to actuate the cross-belt I*; and inasmuch as movement is given to the bar m by the carriage B, as hereinbefore explained, it follows that the carriage itself sets in motion the mechanism which, by shifting the belts, actuates alternately the pulleys E′ and F′, and consequently insures the movement alternately in opposite directions of the carriage. The downward pressure of the anti-friction roller of the elbow-lever upon the adjacent incline of the angular stud n gives an additional impulse to the longitudinal movement of the bar m, which carries it to the end of its stroke and insures the perfect action of the belt-shifter. The air-blast is supplied to the nozzle g, which has the form shown in Fig. 7, and its outlet-opening comprising a long and narrow horizontal slit substantially parallel with the flat edge of the bar D, and extended laterally each way to a distance of several inches from the cutters from a suitable fan-blower or other means of supplying a regular and uniform supply of air under the requisite force and pressure. This is best accomplished by connecting the said nozzle g with the outlet of a fan-blower or the like by a pipe leading from said outlet by means of a suitable length of flexible india-rubber tubing so proportioned that the end attached to the said nozzle will move freely therewith without interfering with the motion of the carriage B. The inlet-pipe of the said nozzle is provided with a cock, r″, by which the volume of air admitted to the nozzle, and consequently the volume of air emitted therefrom, and also the pressure at which the same is ejected, may be regulated, guarded, or controlled as circumstances may require, the conditions as concerns the pressure and the volume of the air-blast varying according to the character of the skin, some furs requiring a heavier pressure and greater volume than others.

It is to be particularly observed that in the practice of my said invention the bar D must not have a "sharply-acute" or "knife" edge, so termed. Neither must it have a rounded or circular edge, inasmuch as, for the reasons hereinbefore particularized, such an edge causes the stiff or water hairs of the skin to be projected at a wide angle, and thereby nullifies the advantages secured by the flat-edged bar D, employed in my said invention as hereinbefore set forth.

I do not claim, in a machine for clipping seal and other skins, a knife-edged bar over which the skin is stretched and fed, inasmuch as such knife-edged bar presents the hairs to the action of the cutting mechanism in a manner different from that of the flat-edged bar herein described as comprised in my said invention, and inasmuch as the flat-edged bar comprised in my invention as aforesaid is designed to obviate and avoid defects inherent in the operation of the knife-edged bar; but

What I claim as my invention is—

1. In an apparatus for removing hairs from seal-skins and other furs, the combination of a flat-edged bar, D, with cutting mechanism, substantially as described, for the purpose herein set forth.

2. In an apparatus for removing hairs from seal-skins and other furs, the combination of rotary cutters C with a straining-bar arranged to present the hairs, as distinguished from the fur, to the action of the cutters C, substantially as and for the purpose herein set forth.

3. The bar D, constructed with a front flat edge, in combination with a rotary cutting device and a nozzle for directing a continuous and regulated air-blast in connection with the operation of the rotary cutter, substantially as and for the purpose herein set forth.

4. The combination of the carriage B, carrying a rotary cutting device, a suitable straining-bar for presenting the hairs to the action of the said cutting device, ways for insuring the rectilinear guidance of the said carriage, fixed belt or strap d, and means, substantially as described, for giving a reciprocating movement to said carriage, all substantially as and for the purpose herein set forth.

5. The combination of the carriage B, carrying a rotary cutting device, the nozzle g for directing a blast of air in connection with the operation of the rotary cutter, a bar for straining the skin coincident with the line of action of the rotary cutter, the pulleys F, and straps for connecting the skin G with the said pulleys and bringing the same across the flat face of the aforesaid straining-bar, all substantially as and for the purpose herein set forth.

6. The combination, with the carriage B, carrying a rotary cutting device and straining-bar, over which the skin may be stretched substantially coincident with the line of action of the said cutters, of the bar m, constructed with the angular stud n, and actuated by the movement of the said carriage, the elbow-lever i, pawl h, ratchet l, and means, substantially as described, for transmitting the intermediate movement of the ratchet-wheel to the pulleys F, and consequently to the skin strained across the straining-bar, all substantially as and for the purpose herein set forth.

7. The combination, with the carriage B, carrying a rotary cutting device, as described, of the bar m, elbow-lever s, slide t, carrying a belt-shifter, straight belt H*, cross-belt I*, and pulleys, substantially as described, for transmitting motion alternately in opposite directions to one of the pulleys D', and thence through the belt d to the carriage B, all substantially as and for the purpose herein set forth.

JOHN W. SUTTON.

Witnesses:
RUDOLF BJELLMAN,
THOMAS E. CROSSMAN.